April 18, 1950 P. G. LAMBRAKOS 2,504,539
THREAD-CHASING TOOL
Filed July 23, 1946 2 Sheets-Sheet 1
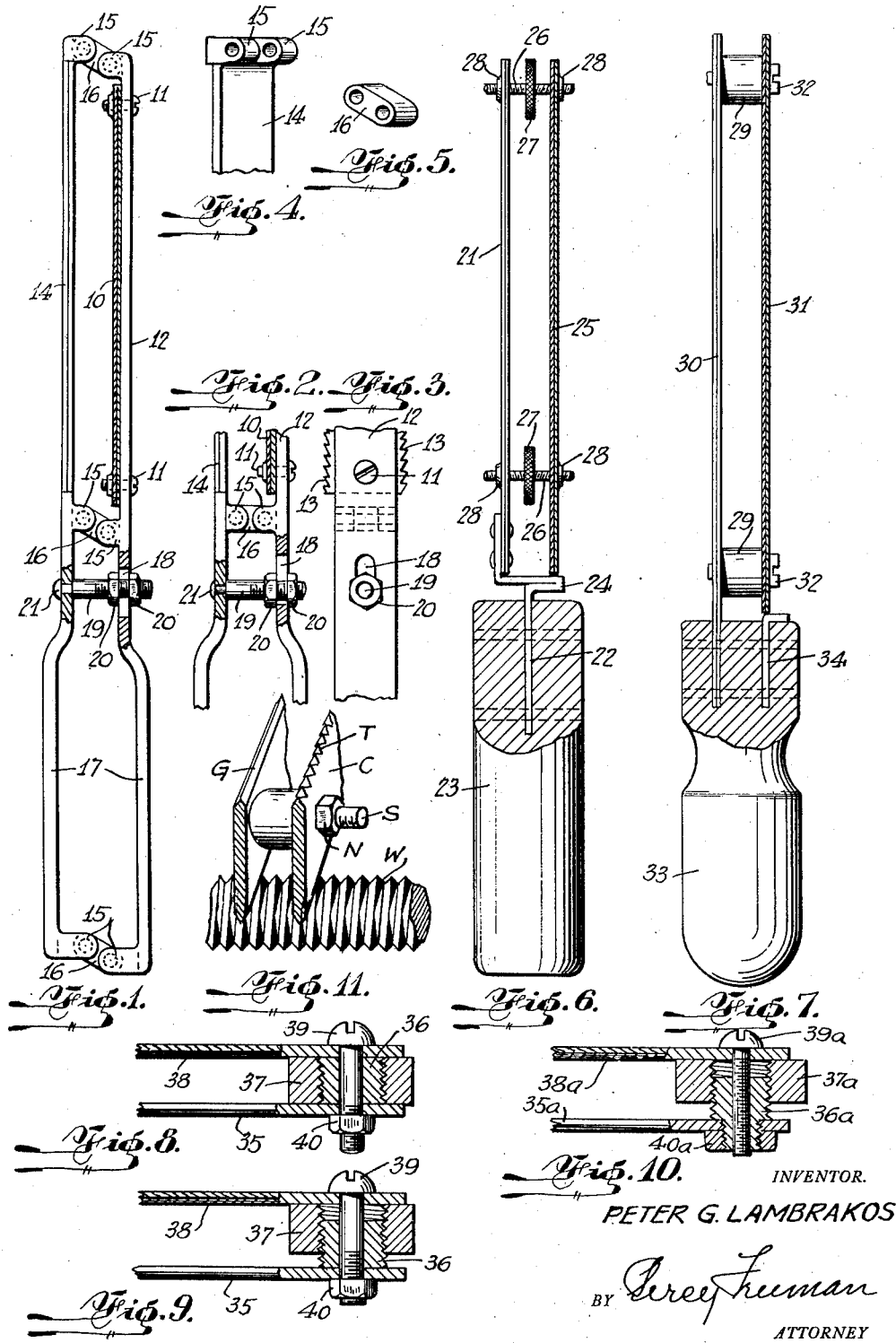
INVENTOR.
PETER G. LAMBRAKOS.
BY Perey Freeman
ATTORNEY April 18, 1950 P. G. LAMBRAKOS 2,504,539
THREAD-CHASING TOOL
Filed July 23, 1946 2 Sheets-Sheet 2
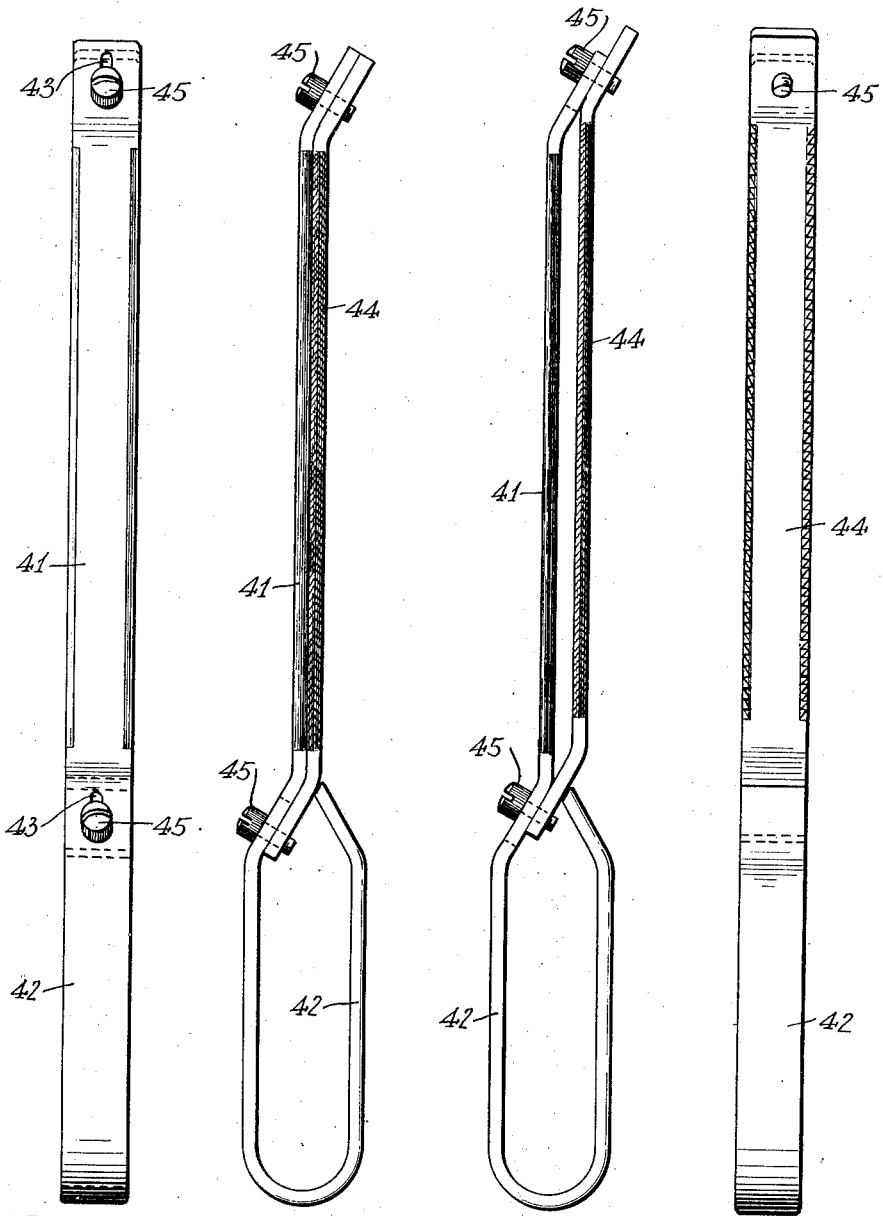
INVENTOR.
PETER G. LAMBRAKOS.
BY Percy Freeman
ATTORNEY Patented Apr. 18, 1950

2,504,539

UNITED STATES PATENT OFFICE 2,504,539

THREAD-CHASING TOOL

Peter G. Lambrakos, New York, N. Y.

Application July 23, 1946, Serial No. 685,657

2 Claims. (Cl. 10—1)

The present invention relates to threading devices and more especially to a tool which is adapted to restore damaged threads on threaded shafts and other threaded objects.

Screw threads frequently become worn or damaged to such an extent that they are no longer serviceable. This usually means replacement or remaking of a part with consequent loss of time and use of the threaded part. In many cases, this may cause stoppage of production or other serious delay. It is sometimes possible to make the necessary repairs by disassembling the machine or other object in which the threaded part is located, but this also means loss time and production and, in addition, expensive tools or other equipment are required. It is clear that it would be highly desirable and advantageous to be able to rethread the part in question in situ by means of a simple, inexpensive tool.

A bolt may have mutilated thread on free end, in which case it is extremely difficult to repair or chase a new thread with a thread die or by the usual methods of a triangular file or hacksaw blade. However, by using my new device, the guide may be set in the good thread and by backing out on the bolt, the thread may be chased or continued right down to the end of the bolt.

One of the objects of this invention is to provide a tool by means of which worn or damaged threads can be restored to a useful condition.

Another object of the invention is to provide a rethreading tool which can be adjusted for use on threads of various pitch and at various distances from a parallel guide bar forming part of the tool.

A further object of the invention is to provide a rethreading tool comprising a guide bar and a cutter with means for maintaining the guide bar and cutter in parallel relationship.

Other and further objects and advantages will be understood by those skilled in this art or will be apparent or pointed out hereinafter.

In the accompanying drawings:

Fig. 1 is an elevational view of a tool responding to the present invention.

Fig. 2 is a fragmentary portion of the tool of Fig. 1, with the parts set at maximum distance from each other.

Fig. 3 is a view at 90° to Fig. 2.

Fig. 4 is a fragmentary perspective view of an end of either of the members of the tool.

Fig. 5 shows the connecting link.

Fig. 6 is an elevation, partly in section, of a modification.

Fig. 7 is an elevation, partly in section, of a further modification of the invention.

Figs. 8 and 9 are fragmentary views, partly in section and partly in elevation, of a still further modification showing the guide bar and cutter in two positions of parallelism.

Fig. 10 is a view similar to Fig. 9 of another modified form of the invention.

Fig. 11 shows a fragmentary perspective view of a further form of tool in actual operation.

Fig. 12 is a front elevational view of a simplified modification of the invention.

Fig. 13 is a side view of the tool of Fig. 12 in closed position.

Fig. 14 is a view similar to Fig. 13, but in an open position.

Fig. 15 is a view of the opposite face of the tool from that of Fig. 12.

My new rethreading tool essentially comprises a cutter, a parallel guide bar, a handle and means for maintaining the cutter and guide bar in parallelism. As illustrated in the drawings, the tool may take various specific forms. In use, relative movement is effected between the tool and the threaded shaft or other threaded part, as will be understood from Fig. 11, and as will be hereinafter more fully explained.

Referring in detail first to Figs. 1-5, inclusive, the cutter 10 is secured at each end, as by screw and nut assemblies 11, to one side member 12 of the tool. Cutter 10 is made of any suitable cutting steel or alloy and has an inverted V-shaped profile with the cutting teeth or serrations 13 of appropriate size and shape along the apex. The cutter is wider than member 12 so that the cutting teeth project on both sides thereof, as is clearly apparent in Fig. 3. It will also be appreciated that cutter 10 is readily removable so that the cutter can be changed whenever necessary or desirable. The other side member 14 of the tool is parallel to member 12 and is formed with a knife-edge along each of the opposite edges thereof. Each knife-edge is adapted to operate in the groove of the screw thread and the cutter is a follower or chaser at a predetermined distance. Members 12 and 14 are provided with a pair of spaced apertured hinge elements 15 at each extremity and intermediate their ends and these elements are interconnected by links 16. Suitable pins or pintles extend through the registering apertures and in this way the distance between members 12 and 14 can be varied without disturbing their parallelism. The lower portions of members 12 and 14 serve as a handle 17 and are preferably but not necessarily spaced farther apart. Just above the handle, member 12 is provided with an elongated slot 18 through which passes threaded member 19. A pair of nuts 20 locks members 12 and 14 in adjusted parallel positions, it being understood that the nuts are loosened and/or moved along member 19 preparatory to a change in the spacing of the members. The other end of member 19 may be suitably held in the member 14 by any suitable means such as that shown at 21.

In Fig. 6, the guide bar 21 is secured to an anchor member 22 embedded in handle 23. The intermediate portion of member 22 forms a rest or abutment 24 for cutter 25. Guide bar 21 and cutter 25 may be relatively advanced or retracted to increase or decrease the space therebetween. This is effected by right-and-left-hand screws 26 actuated by hand wheels 27. To ensure exact parallelism, an internal or external caliper (not shown) can be used for checking and adjusting purposes. Suitable washers or the like 28 are provided for strengthening and guiding purposes, or nuts may be mounted on screws 28, if preferred.

Fig. 7 shows another form of the invention in which cylindrical or sleeve spacers 29 separate guide bar 30 from cutter 31. Screws 32 extend through and maintain the members in proper assembly, as shown. In this case, the end of the guide bar 30 is anchored in handle 33 and a backing up member 34 for cutter 31 is also anchored in the handle to lend strength and rigidity to the cutter. The spacing between the guide bar and cutter is parallel due to the equal lengths of the spacers 29 and other equal spacings can be simply and readily achieved by changing the spacers to spacers of any desired lengths.

Parallelism and adjustability can be obtained in an effective, accurate manner by the structure shown in Figs. 8 and 9. The guide bar 35 has a hollow, exteriorly threaded boss 36 fixed thereto which is adapted to engage the hollow annular interiorly threaded spacer 37 located between guide bar 35 and cutter 38. A screw 39 passes through the assembly which is maintained in operative association by the nut 40 on screw 39. By rotating spacer 37, after loosening nut 40, the spacing between the guide bar and cutter may be altered. Increased spacing is indicated in Fig. 9 as compared with Fig. 8. Any suitable number of such arrangements may be provided but two are ordinarily sufficient. This form of the invention is susceptible of further variation, as shown in Fig. 10, in which the boss 36a has a reduced end threaded through guide bar 35a on which nut 40a is threaded, the shank of screw 39a terminating in or extending slightly beyond the said reduced end.

Fig. 11 illustrates the manner of using the rethreading tool and is not specifically intended to designate any particular form of tool. The figure is rather intended in a diagrammatic sense to show the relative positions of the rethreading tool and the threaded part during the rethreading operation. For this purpose, the threaded part—such as a screw shaft—is designated by the letter W standing for workpiece. The guide bar G and the cutter C are held in parallel spaced relationship by screw S and nut N. The distance between the guide bar and cutter is equal to a predetermined whole number of turns of the thread of the workpiece W. The guide bar has a knife edge on either edge and the cutter has cutting teeth T on either edge. As the guide bar passes along the helical valley of the screw thread, the cutter follows and rethreads the worn or damaged peaks.

The preferred form of the invention is illustrated in Figs. 12 to 15, inclusive, which shows a simplified but highly effective tool composed of only two pieces and two screws. One piece includes the guide bar 41 and an angular extension at each end thereof. One such angular extension continues and forms a loop-shaped handle 42 which terminates close to but somewhat spaced from the angular extension between the handle and guide bar. Each such angular extension is provided with an elongated slot 43. The other piece includes the cutter 44 with an angular extension at each end thereof. A screw 45 with an enlarged head passes through each slot 43 and engages an aperture in each angular extension of the cutter, as shown. The angles which the respective angular extensions make with the guide bar and cutter are equal so that the parts nest, as will be observed from Fig. 13. By loosening screws 45, the cutter can be slid to the spaced position of Fig. 14, the screws moving in slots 43. By tightening the screws again, the adjusted position is maintained. In this form of the invention, non-parallel positions of the guide bar and cutter are impossible since parallelism is inherent in the structure just described. I have found that an angle of 30° for the angular extension is ideal, but other angular relationships fall within the purview of the invention which is rather that defined by the appended claims.

Having thus described my invention, what I claim as new and desire to secure by Letters Patent, is:

1. A tool for restoring mutilated threads on externally threaded machine elements, comprising a guide bar member for following a non-mutilated portion of a thread, a cutter member parallel to said guide bar member for restoring the mutilated thread, and means for adjustably varying the space between said members while maintaining parallelism between them, said means comprising similar obtuse angular extensions on each end of said members, the extensions of the corresponding ends of said members having face-to-face relation, said members being relatively slidable in the planes of their respective extension interfaces, whereby said cutter can be slid with respect to said guide bar to alter the spacing therebetween, and means for securing said members in adjusted position.

2. A tool for restoring mutilated threads on externally threaded machine elements, comprising a guide bar member for following a non-mutilated portion of a thread, a cutter member parallel to said guide bar member for restoring the mutilated thread, and means for adjustably varying the space between said members while maintaining parallelism between them, said means comprising similar obtuse angular extensions on each end of said members, the extensions of the corresponding ends of said members having face-to-face relation, said members being relatively slidable in the planes of their respective extension interfaces, whereby said cutter can be slid with respect to said guide bar to alter the spacing therebetween, the angular extensions of one of said members each being provided with an elongated slot, a screw extending through each of said slots, said screws having threaded engagement with the corresponding extensions of the other of said members.

PETER G. LAMBRAKOS.

REFERENCES CITED

The following references are of record in the file of this patent:

UNITED STATES PATENTS

| Number | Name | Date |
|---|---|---|
| 877,813 | Waller | Jan. 28, 1908 |
| 1,069,189 | Saltzman | Aug. 5, 1913 |
| 1,205,711 | Dwyer | Nov. 21, 1916 |
| 1,218,389 | Fougere | Mar. 6, 1917 |
| 1,228,728 | White | June 5, 1917 |
| 1,421,052 | White | June 27, 1922 |
| 1,520,711 | Hobart | Dec. 30, 1924 |
| 1,889,013 | Berner | Nov. 29, 1932 |
| 1,906,881 | Olas | May 2, 1933 |
| 2,134,839 | Perkins | Nov. 1, 1938 |
| 2,301,737 | Miller | Nov. 10, 1942 |
| 2,396,443 | Singer | Mar. 12, 1946 |

FOREIGN PATENTS

| Number | Country | Date |
|---|---|---|
| 150,483 | Great Britain | Sept. 9, 1920 |
| 476,564 | Germany | May 22, 1929 |